No. 748,930. PATENTED JAN. 5, 1904.
P. J. COLLINS.
AUTOMOBILE.
APPLICATION FILED JULY 21, 1900. RENEWED SEPT. 2, 1902.
NO MODEL. 2 SHEETS—SHEET 1.
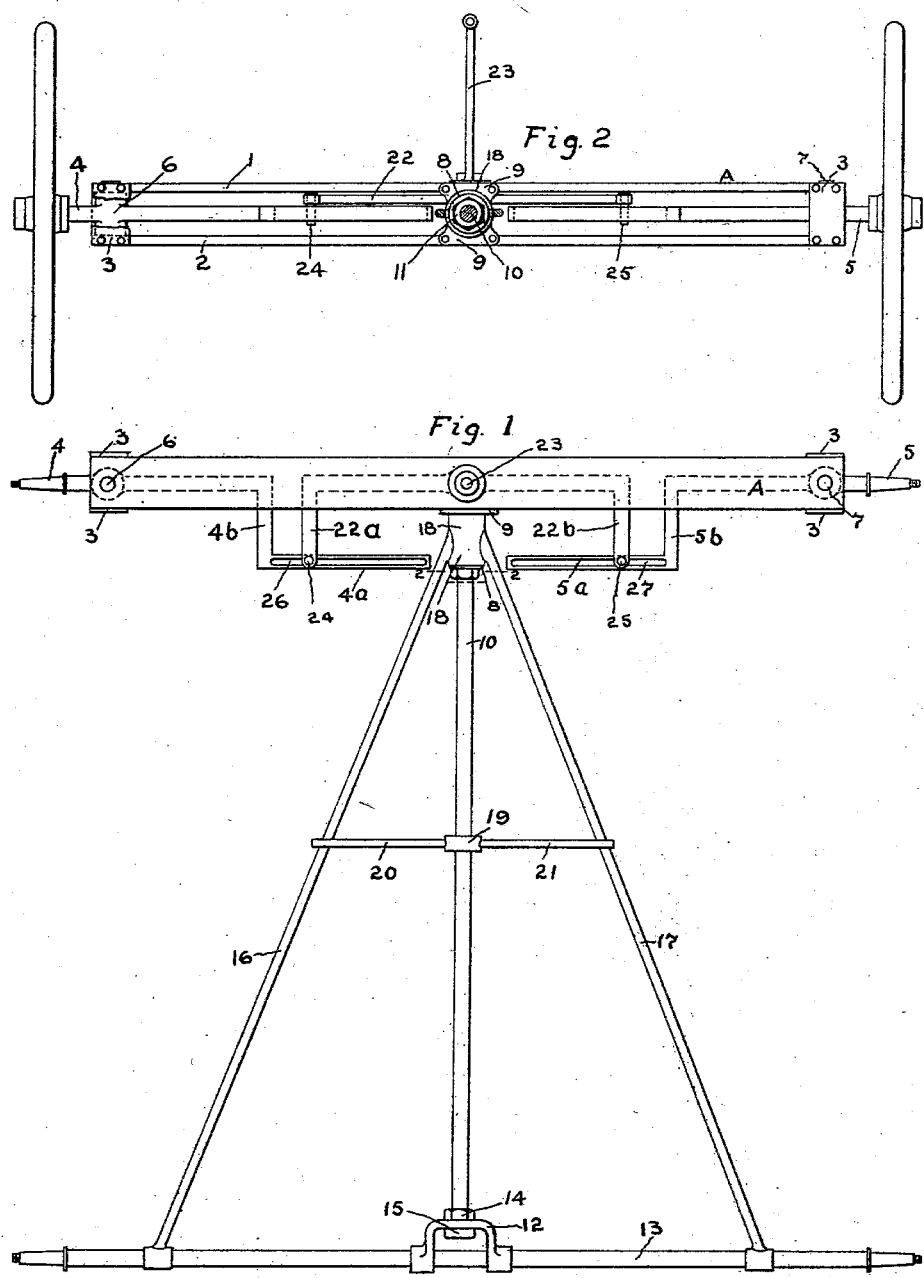

No. 748,930. PATENTED JAN. 5, 1904.
P. J. COLLINS.
AUTOMOBILE.
APPLICATION FILED JULY 21, 1900. RENEWED SEPT. 2, 1902.
NO MODEL. 2 SHEETS—SHEET 2.
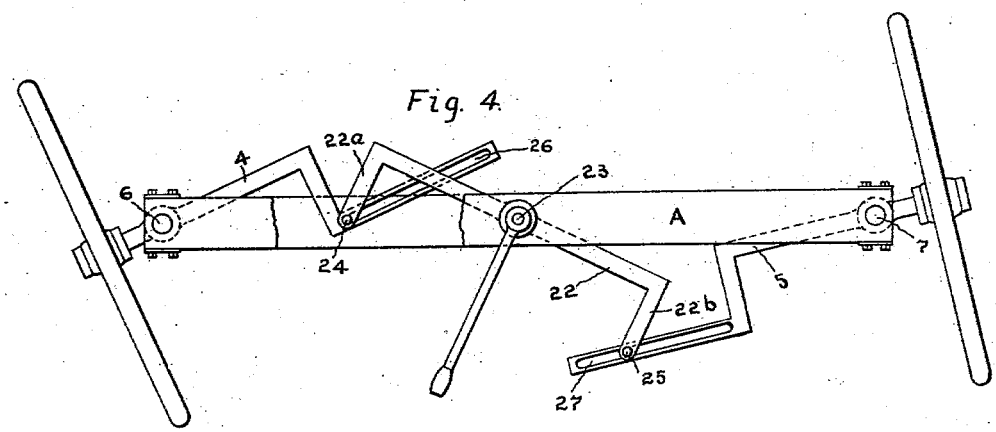
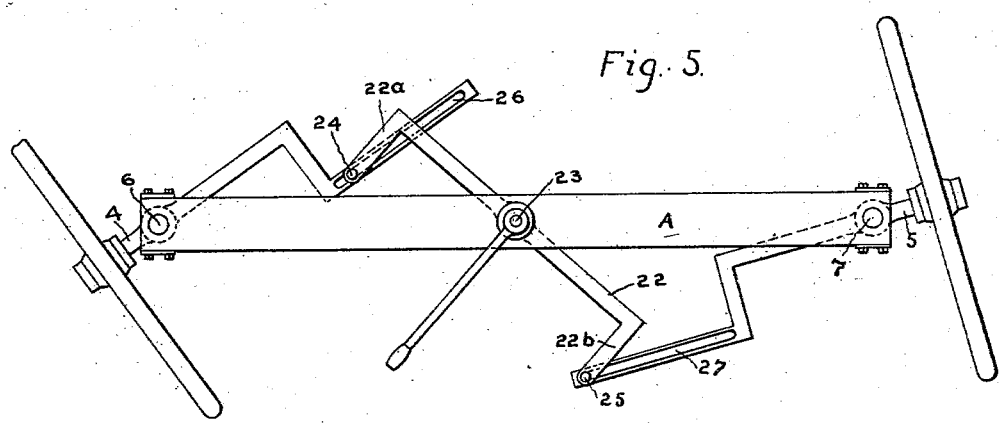
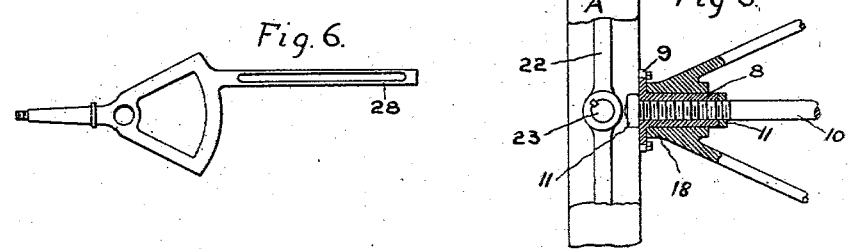
Witnesses
J. C. Blandford.
Fred C. Williams
Inventor
Patrick J. Collins
by Watson & Watson
Attorneys No. 748,930. Patented January 5, 1904.

UNITED STATES PATENT OFFICE.

PATRICK J. COLLINS, OF SCRANTON, PENNSYLVANIA, ASSIGNOR, BY MESNE ASSIGNMENTS, TO RICHARD J. BOURKE, TRUSTEE, OF SCRANTON, PENNSYLVANIA.

AUTOMOBILE.

SPECIFICATION forming part of Letters Patent No. 748,930, dated January 5, 1904.

Application filed July 21, 1900. Renewed September 2, 1902. Serial No. 121,850. (No model.)

*To all whom it may concern:*

Be it known that I, PATRICK J. COLLINS, a citizen of the United States, residing at Scranton, in the county of Lackawanna and State of Pennsylvania, have invented certain new and useful Improvements in Automobiles, of which the following is a specification.

This invention comprises certain improvements in the steering mechanism and frame of automobiles whereby the guiding of the vehicle is facilitated and the strain upon the frame in passing over rough roads is lessened.

In the accompanying drawings, which illustrate the invention, Figure 1 is a plan view of the wagon-frame embodying my improvements, the forward axles being shown in their normal or central position. Fig. 2 is a rear view of the forward part of the frame, the reach being shown in section on the line 2 2 of Fig. 1. Fig. 3 is a detail view showing a horizontal section through the bearing upon which the reach is journaled. Figs. 4 and 5 are plan views showing the steering-lever and axles in different positions, and Fig. 6 is a similar view of a modified form of axle.

Referring to the drawings, A indicates a casing or support for the forward axles, consisting of upper and lower flat bars 1 and 2, united at their ends by side pieces 3. Half-axles 4 and 5 are journaled in the opposite ends of the casing by means of trunnions 6 and 7, respectively, said trunnions being formed integrally with the axles and having bearings in the upper and lower plates of the casing.

In order that the forward and rear wheels may pass over ordinary obstructions upon the road without tilting the carriage-body and without straining the reach or affecting each other to any extent, I connect the forward axle-support to the rear axle in a pivotal manner, so that the forward and rear wheels may move vertically and independently of each other. As shown in Figs. 1, 2, and 3, a rearwardly-extending bearing 8 is secured to the center of the casing A by means of a flange or head 9, which is attached to the edges of the upper and lower plates 1 and 2. The forward end of a rod 10 extends through a central longitudinal threaded opening in the bearing and is secured therein by means of nuts 11. The opposite end of the rod is journaled in a suitable bearing 12, centrally mounted upon the rear axle 13, and nuts or stops 14 and 15 are arranged upon the rod on either side of the bearing to prevent end motion. The rods 16 and 17, which form the reach, are secured in the usual manner to the rear axle, and their forward ends are attached to a sleeve 18, which is journaled upon the bearing 8. By adjusting the rod 10 within the bearing 8 the forward end of the sleeve may be brought up against the flange 9, so as to avoid end play. A bearing 19 is arranged midway of the shaft 10, said bearing being carried by brace-rods 20 and 21, which are secured to the members 16 and 17 of the reach. It will be seen that with this construction when either of the forward wheels is raised by an obstruction the bearing 8 will turn within the sleeve 18 and the rod 10, which is fixed to the bearing 8, will turn within the bearings 19 and 12, and when either of the rear wheels is elevated the sleeve and bearings 19 and 12 will turn relatively to the rod, so that the elevation of either of the front wheels will not lift the corresponding rear wheel, and vice versa. The wagon will therefore move more smoothly over the road than would one in which the front and rear axles are held in the same or parallel planes by the reach.

As shown in the various figures, the forward axles are not straight, their inner ends $4^a$ and $5^a$ being rearwardly offset from the bodies of the axles, so that when the axles are in their normal positions for straight forward movement, as shown in Fig. 1, their inner ends $4^a$ and $5^a$ will be in the rear of the line joining the pivotal points of the axles. These inner ends, which are connected to the main parts of the axles by right-angled portions $4^b$ and $5^b$, are in sliding engagement with the opposite ends of a lever 22, secured to the steering-head 23, which latter is journaled centrally and vertically in the casing in front of the parts $4^a$ and $5^a$ of the axles. The ends 22ᵃ and 22ᵇ of the steering-lever are bent rearwardly and provided with pins or studs 24 and 25, which engage the slots 26 and 27, respectively, formed in the offset ends of the axles.

A movement of the steering-lever either way from the central position (shown in Fig. 1) will cause the inner ends of the axles to move in opposite directions; but owing to the fact that said ends are offset and out of line with the pivotal axis of the steering-lever the axles will turn upon their pivots to relatively different degrees. In Fig. 1 it will be noted that the pins 24 and 25 of the lever are at equal distances from the outer ends of the slots in the axles. During the movement of the lever from this position to the position shown in Fig. 4, wherein the pin 24 is on the line joining the centers of the trunnions, said pin moves toward the outer end of the slot 26, and after passing beyond this line the pin moves a short distance away from the end of the slot, as illustrated in Fig. 5. At the same time it will be noted that the pin 25 continuously moves away from the outer end of the slot 27 and toward its inner end. As each pin moves through the same circular distance the power is applied through the pins to the axles at different distances from their pivotal points, and one of said axles, in this case the axle 4, will be moved through a greater angle than the other. If the steering-handle be turned in the opposite direction, the position of the axles will of course be reversed and the axle 5 will turn through a greater angle from the central position than the axle 4. By properly proportioning and arranging the parts the wheels may thus be deflected from parallel planes sufficiently to prevent slippage of the inner wheel in turning corners.

When the lever and the axles assume the extreme position, (shown in Fig. 5,) the pin 25 reaches the end of the slot 27, and in this position the axles cannot be moved by obstructions which may be encountered by the left-hand wheel, as the resistance offered to said wheel tends to force the pins toward the inner ends of the slots, while the slot 27 is so nearly at a right angle to a line passing through the pin 25 and the center of the steering-head that an obstacle encountered by the right-hand wheel would only have a very slight tendency to turn it. The axles may thus be moved to the extreme position for steering, in which position they are locked with a very short movement of the steering-lever, and they may be moved into and held in any intermediate position with slight effort.

The axles may be differently constructed, as well as the steering-lever.

In Fig. 6 I have shown an axle similar to the one illustrated in my pending application, Serial No. 5,282, filed February 15, 1900, except that the slotted end 28 of the axle is arranged at one side of the line passing longitudinally through the outer end of the axle to suit it for the purpose of the present invention.

The steering-lever need not necessarily be mounted in line with the pivotal points of the axles; but it should be pivoted in front of the parts of the axles which are in sliding engagement with the ends of the lever. The relative movements of the axles will vary with the location of the pivotal point of the steering-lever, and I prefer for practical reasons to locate the steering-head in line with said pivotal points.

Having described my invention, what I claim, and desire to secure by Letters Patent of the United States, is—

1. In a motor-vehicle, the combination with a pair of pivoted axles, of a centrally-pivoted steering-lever having its opposite ends in sliding engagement with said axles, the parts of the axles which engage the lever lying normally in the rear of the pivotal point of the steering-lever.

2. In a motor-vehicle, the combination with a pair of pivoted axles having their inner end portions lying normally at the rear of a line passing through the pivotal points of the axles and extending transversely of the vehicle, of a steering device having parts in sliding engagement with said inner end portions.

3. In a motor-vehicle, the combination with a pair of pivoted axles of a centrally-pivoted steering-lever having its opposite ends in sliding engagement with said axles, the parts of said axles which engage the lever lying normally in the rear of the line passing through the pivotal points of the axles.

4. In a motor-vehicle, the combination with a pair of pivoted axles having their inner ends normally extending at one side of the line passing through their pivotal points, of a steering-lever pivotally mounted forward of said ends and having rearwardly-turned arms in sliding engagement with said ends.

5. In a motor-vehicle, the combination with a pair of pivoted axles having their inner ends offset from and substantially parallel with the outer ends of the axles, said offset ends having longitudinal slots therein, of a steering-lever centrally pivoted between the axle-bearings and having rearwardly-extending arms and pins on said arms adapted to engage the slots in the axles.

6. In a motor-vehicle, the combination with a rear axle and an axle casing or support for the forward axles, of a rod secured to the center of said support, a reach fixed to the rear axle and having a sleeve at its forward end surrounding said rod, and a bearing in fixed relation to the rear axle for the rear end of said rod.

7. In a motor-vehicle the combination with a rear axle and an axle casing or support for the forward axles, of a rearwardly-extending bearing fixed to the center of said support, a rod secured to said bearing and journaled to the rear axle, and a reach fixed to the rear axle and having a sleeve at its forward end journaled upon said bearing.

8. In a motor-vehicle the combination with a rear axle and an axle casing or support for the forward axles, of a rearwardly-extending bearing secured to the center of said support, a reach fixed to the rear axle and journaled at its forward end upon said bearing, a rod journaled at its rear end to the center of the rear axle and having its forward end secured within said rearwardly-extending bearing, and means for adjusting said rod longitudinally.

In testimony whereof I affix my signature in presence of two witnesses.

PATRICK J. COLLINS.

Witnesses:
ROBERT WATSON,
M. F. SANDO.